United States Patent Office 3,499,846
Patented Mar. 10, 1970

3,499,846
METHOD OF CATALYST PREPARATION
Edward Michalko, Chicago, Ill., assignor to Universal Oil Products Company, Des Plaines, Ill., a corporation of Delaware
No Drawing. Filed Dec. 11, 1967, Ser. No. 689,321
Int. Cl. B01j 11/40; C10g 11/04
U.S. Cl. 252—451                                          15 Claims

ABSTRACT OF THE DISCLOSURE

A method of catalyst preparation. The catalyst is a crystalline aluminosilicate dispersed in a silica matrix. A finely divided crystalline alkali metal aluminosilicate is dispersed in a silica sol and treated in contact with a solution comprising hydrogen ions at a pH of 3.5–4.0, before or after gelation, to provide an improved catalyst, particularly with respect to the catalytic cracking of petroleum hydrocarbons.

BACKGROUND OF THE INVENTION

For many years petroleum hydrocarbon feed stocks boiling in the range above about 400° F. have been converted to lower boiling hydrocarbons in the motor fuel boiling range by heating them at a temperature of from about 600° F. to about 1100° F. in contact with an amorphous silica-alumina cracking catalyst. While other similar composites, e.g., silica-zirconia, silica-magnesia, etc., have been known to catalyze the cracking reaction, a silica-alumina composite has been by far the most widely accepted catalyst in the industry. More recently, improved catalysts have been prepared by the inclusion of a finely divided zeolite, or crystalline aluminosilicate, either naturally occurring or synthetically prepared, within the silica-alumina matrix. Other inventors have prepared, tested and compared hydrocarbon conversion catalysts comprising a finely divided crystalline aluminosilicate distributed throughout an amorphous silica matrix on the one hand, and throughout an amorphous silica-alumina matrix on the other hand. The general conclusion has been that the amorphous silica-alumina matrix affords a superior cracking catalyst. It has been discovered that a superior catalyst can in fact be prepared utilizing an amorphous silica matrix, particularly when prepared in the manner hereinafter described. That this is totally unexpected in the art is evidenced by the fact that in spite of the comparatively low cost of silica the industry has turned almost exclusively to silica-alumina.

It is an object of this invention to present an improved hydrocarbon conversion catalyst comprising a crystalline aluminosilicate dispersed in an amorphous silica matrix. It is a further object to present a novel process for preparing said improved catalyst. It is a still further object to present a process for the catalytic cracking of hydrocarbons whereby improved hydrocarbon conversion is effected with improved selectivity and low coke yield.

SUMMARY OF THE INVENTION

In one of its broad aspects the present invention embodies a method of preparing a catalyst composite comprising a crystalline aluminosilicate dispersed in a silica matrix which comprises (a) forming a homogenized slurry comprising a finely divided crystalline alkali metal aluminosilicate and water, (b) admixing said slurry with a silica sol, (c) treating the reaction mixture at conditions effecting gelation of said sol, (d) adjusting the pH of the reaction mixture to from about 5 to about 8 and aging the same at said pH for a period of at least about 0.5 hour, (e) separating the aged gelation product, and (f) drying the resulting catalyst composite; said method being further characterized in that the product of at least one of the steps (a), (b), (c), (d), (e) or (f) is treated, prior to treatment in accordance with a next succeeding step, in contact with an ion-exchange solution comprising hydrogen ions for a period of at least about 0.5 hour while maintaining the pH of the reaction mixture at from about 3.5 to about 4.0.

In accordance with the method of this invention a finely divided crystalline alkali metal aluminosilicate is initially dispersed in aqueous media and formed into a homogenized slurry. While the method of this invention is operable to manufacture catalysts comprising the general class of crystalline aluminosilicates, e.g., mordenite, faujasite, etc., dispersed in a silica matrix the method is of particular advantage in the manufacture of catalysts comprising a faujasite dispersed in a silica matrix and the subsequent description of the invention is presented with respect thereto. The alkali metal aluminosilicate, usually the sodium form, utilized pursuant to the method of the present invention can be a naturally occurring faujasite. However, as a practical matter, a synthetically prepared faujasite is preferred. The faujasites herein contemplated have been defined in the literature and do not warrant an extensive description here. Briefly, the faujasite is a zeolite, or crystalline aluminosilicate, of three dimensional structure, the crystalline form being often described as a truncated octahedra with pore openings in the range of from about 6 to about 15 angstroms. The faujasites can be represented in terms of mole ratios of oxides in the following manner:

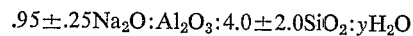

$$.95 \pm .25 Na_2O : Al_2O_3 : 4.0 \pm 2.0 SiO_2 : yH_2O$$

wherein $y$ is a number up to about 8. It is preferred to utilize a faujasite characterized by a silica-alumina ratio of at least about 3, for example, a faujasite represented in terms of mole ratios of oxides as follows:

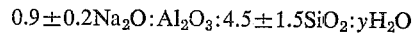

$$0.9 \pm 0.2 Na_2O : Al_2O_3 : 4.5 \pm 1.5 SiO_2 : yH_2O$$

The synthetic crystalline aluminosilicates are commercially available, or they may be prepared in any conventional or otherwise convenient manner. For example, one preferred method of preparation comprises forming an aqueous solution of sodium aluminate and sodium hydroxide and a reactive amorphous silica. Suitably, the amorphous silica reactant may be fume silica, chemically precipitated silica, a precipitated silica sol, and such silicas as are described by the trade names "Hi-Sil," "Cab-O-Sil," and the like. The resulting reaction mixture preferably comprises a molar ratio of $Na_2O$ to $SiO_2$ of at least about 0.3 and generally not in excess of about 0.8. Sodium aluminate comprising a molar ratio of $Na_2O$ to $Al_2O_3$ of about 1.5 is suitably employed as a reactant. The selected silica source and the sodium aluminate solution are employed in amounts such that the mole ratio of silica to alumina in the reaction mixture is from about 6 to about 20. Thus, the reaction mixture preferably has a composition which may be expressed as a mixture of oxides as follows: $SiO_2$ to $Al_2O_2$ in a molar ratio of from about 6 to about 20, $Na_2O$ to $SiO_2$ in a molar ratio of from about 0.3 to about 0.8 and $H_2O$ to $Na_2O$ in a molar ratio of from about 35 to about 60. In any case the reaction mixture is heated, usually at a temperature of about 212° F., in a closed vessel to avoid water loss. The crystalline aluminosilicate reaction product which precipitates from the hot reaction mixture is separated and water washed until the water in equilibrium with the crystals attains a pH of from about 9 to about 12.

The finely divided faujasite dispersed in aqueous media is thoroughly homogenized before admixing the same with an acidic silica hydrosol in the manner hereinafter described. The faujasite is suitably homogenized in water in a concentration and to the extent that there is essentially no settling of the faujasite for a period of at least about 10 minutes subsequent to the homogenizing process. While the concentration of the faujasite in the aqueous media is not considered critical, a faujasite/water weight ratio of about ⅕ has produced a suitable homogenized slurry upon thorough and adequate mixing.

The finely divided faujasite thus homogenized is admixed with an acidic silica hydrosol in an amount to insure a final catalyst composite comprising from about 1.0 to about 60 weight percent faujasite dispersed in the amorphous silica matrix, preferably from about 2.5 to about 20 weight percent. In the practice of this invention, the homogenized faujasite slurry is admixed with an acidic silica hydrosol at a pH of from about 4.0 to about 4.5. The silica sol hereinabove referred to is available by conventional methods of preparation. Preferably, the sol is prepared by the acidification of an alkali metal silicate solution. The alkali metal silicate most often employed is an aqueous sodium silicate solution commercially available as "water glass." Acidification with a proper amount of acid such as hydrochloric acid, sulfuric acid, and the like, effects hydrolysis of the water glass and the conversion thereof to a silicic acid or a silica sol. The homogenized faujasite may be admixed with the acidic silica hydrosol in a manner whereby said faujasite is initially added to, for example, a sodium silicate solution and resulting mixture acidified with sulfuric acid to establish the desired pH value of from about 4.0 to about 4.5. A preferred method comprises acidifying an aqueous sodium silicate solution with an aqueous sulfuric acid solution of a concentration sufficient to establish the desired pH of from about 4.0 to about 4.5, and thereafter admixing the faujasite slurry with the acidic silica hydrosol at a temperature of from about 70° F. to about 110° F., preferably at a temperature of from about 90° F. to about 100° F. A preferred method of establishing the desired temperature comprises initially adjusting the temperature of the aforementioned sodium silicate solution so that upon admixing the sulfuric acid solution therewith, the resulting acidified silica hydrosol temperature is in the desired range. Since gelation of the acidic silica hydrosol occurs within a matter of minutes, usually within from about 10 to about 15 minutes, at the described conditions, the faujasite should be admixed with the hydrosol without undue delay.

One embodiment of this invention concerns the treatment of the last mentioned reaction mixture or product resulting from the commingling of said homogenized faujasite slurry with said silica sol. Typically, in the manufacture of a silica gel useful as a catalyst or component thereof as herein contemplated, it is desirable to effect gelation of the silica sol at conditions to yield a gel of particular physical properties. Thus, while a silica sol will set to a gel substantially immediately under the proper conditions, it is preferable to treat the sol at conditions permitting gelation over a more extended period, suitably over a period of 15–30 minutes, whereby the desirable physical properties are obtained. One factor which influences the gelation rate is the pH of the reaction mixture, a pH of from about 2.5 to about 4.5 being customarily employed. However, in view of the acid instability of the crystalline aluminosilicates, in particular the preferred faujasites, it has heretofore been the practice to avoid undue exposure thereof to the acidic conditions conducive to the development of desirable physical properties in the silica gel. However, it has now been found that the crystalline alkali metal aluminosilicate is benefited by exposure to such acidic conditions provided that the pH is maintained within the range of from about 3.5 to about 4.0. Thus, in the present embodiment, the reaction mixture or product resulting from the commingling of said homogenized faujasite slurry with said silica sol is aged in contact with an ion-exchange solution comprising hydrogen ions for a period of at least about 0.5 hour while maintaining the reaction mixture at a pH in the range of from about 3.5 to about 4.0 during which time gelation may occur. This relatively narrow pH range is considered to be essential to the preparation of the improved catalyst of this invention. The improvement has not been observed at a pH of less than about 3.5 or in excess of about 4.0. As stated, the aging period should be at least about 0.5 hour. However, the aging period may be as much as 6 hours or more.

The ion-exchange solution may be an aqueous solution of a strong mineral acid such as sulfuric acid, hydrochloric acid and the like. However, in view of the limited pH range at which the method of this invention is operable, it is preferred to utilize a weak acid, suitably an acetic acid solution. This minimizes the risk of exceeding the pH limitation since comparatively large quantities of such acid will effect a relatively slight change in the pH of the reaction mixture. This is particularly important when operating at the low end of the pH range, i.e., 3.5.

After the reaction mixture has been permitted to age at the described acidic conditions, preferably under conditions of rapid and continuous stirring, and gelation has been effected, the resulting slurry is adjusted to a pH of from about 5 to about 8, preferably a pH of from about 6 to about 7. The reaction mixture is thereafter aged for a time sufficient to develop optimum pore structure of the silica hydrogel, a period of from about 0.5 to about 3 hours being suitable, the period of from about 0.5 to about 1.5 hours being preferred. The last aging step is conveniently referred to as basic age in contrast to the first mentioned acid age.

The acid treatment has been described herein as applied to the process before gelation of the silica sol occurs. However, the acid treatment can be suitably accomplished after gelation, or after basic aging of the product and either before or after separation thereof from the reaction mixture. Further, the said acid treatments may be cumulative or in the alternative, although the latter will suitably accomplish the objectives of this invention.

The basic aged gelation product is preferably slurried with water to a smooth consistency suitable for spray-drying. One convenient method comprises recovering the basic aged product as a filter cake. The filter cake is then reslurried with water to a smooth consistency and subjected to spray-drying whereby a rapid evaporation of moisture is effected and dried particles fall out of the spray. If so desired, the aforesaid filter cake can be water-washed to concentrate and partially remove soluble salts prior to the spray-drying process. Alternatively, the spray-dried material can be reslurried and subjected to one or more water-washings to reduce the soluble content to an acceptable level.

The spray-drying step comprises spraying the aqueous slurry in an atomized state into a tower of hot flowing gases. The hot flowing gases are injected into the tower at a temperature to effect a rapid evaporation of moisture so that dried particles of predetermined size range fall out of the spray. The hot flowing gases are suitably injected into the tower at conditions to effect an initial contact with the atomized spray at a temperature of from about 400° F. to about 1200° F. the temperature in the upper range, say from about 650° F. to about 1200° F., being preferred. Hot flue gases have been conveniently and advantageously employed.

The spray-dried material is further treated with an ammonium salt solution, such as ammonium sulfate, to remove substantially all of the sodium, or other alkali metal ions. Suitably, the spray-dried material is treated in contact with said ammonium salt solution whereby the total alkali metal content thereof is reduced to less than about 1 weight percent thereof, preferably less than 0.2 weight percent.

The catalyst composite prepared in accordance with the method of this invention can be composited with any of the several catalytically active metallic materials in the oxidized or reduced state. In one preferred embodiment, the composite, substantially free of alkali metal, is further treated in contact with a solution, preferably an aqueous solution, comprising both rare earth cations and ions selected from the group consisting of hydrogen ions, hydrogen ion precursors, and mixtures thereof. The ratio of hydrogen ions, or ions capable of conversion to hydrogen ions, to rare earth metal ions is not considered critical and may vary over a relatively wide range. A particularly suitable solution is one containing rare earth metal ions and hydrogen ions, or ions capable of conversion to hydrogen ions, in a ratio of from about 10/1 to about 1/1 whereby a base-exchange reaction is effected to yield a composite which comprises aluminum and rare earth metals in a ratio of from about 3/1 to about 6/1. Organic and inorganic acids are generally considered as a convenient source of hydrogen ions. However, it is preferred to utilize a hydrogen ion precursor, particularly an ammonium salt such as ammonium chloride, which is decomposable to provide hydrogen ions at a temperature below the decomposition temperature of the faujasite.

The rare earth metals include cerium, lanthanum, praseodymium, neodymium, illinium, samarium, europium, gadolinium, terbium, dysprosium, holmium, erbium, thulium, scandium, yttrium, and lutecium. A wide variety of rare earth compounds can be employed with facility as a source of rare earth metal ions. Suitable soluble compounds include rare earth chlorides, bromides, iodides, sulfates, acetates, benzoates, citrates, nitrates, and the like. The preferred rare earth salts are the chlorides, nitrates and sulfates. The rare earth metal salts employed can either be the salt of a single rare earth metal, or, as is usually the case, mixtures of rare earth metals. It is contemplated that the product thus treated comprises rare earth cations chemisorbed or ionically bonded to the faujasite, although it may very well be that at least a portion of said cations may be sorbed or bonded to the amorphous silica component of the catalyst composite. Anions introduced to the composite as a consequence of the base-exchange treatment are suitably separated by water-washing one or more times until free of said ions. The composite is thereafter dried, generally in an air atmosphere, an elevated temperature of from about 150° F. to about 600° F. being suitable. The catalysts thus prepared are particularly effective in the cracking of hydrocarbon feed stocks, such as occur in the gas-oil range of petroleum hydrocarbons, to form lower boiling hydrocarbons in the motor fuel range at catalytic cracking conditions generally described in the art. In particular, a temperature of from about 700° F. to about 1200° F. may be employed and the pressure may range from subatmospheric to several atmospheres. The cracking process can be effected by any of the well-known techniques including a fixed bed type of operation, a moving bed type of operation, and, in particular, the well-known fluidized bed type of operation.

Also of interest are those catalysts comprising one or more metals of Group VI–B and VIII including molybdenum, tungsten, chromium, iron, nickel, cobalt, platinum, palladium, ruthenium, rhodium, osmium and iridium. Thus, the catalyst composite prepared in accordance with the process of this invention can be utilized advantageously as a catalyst, or as a component thereof, to effect a variety of hydrocarbon conversion reactions involving reaction conditions comprising a temperature in the 70–1400° F. range. The catalyst composite of this invention is particularly useful in combination with a hydrogenation component such as nickel together with molybdenum, tungsten, etc., in effecting the hydrocracking of heavy oils, including vacuum residuals, in the presence of hydrogen to form petroleum products in the middle distillate range utilizing a temperature of from about 500° F. to about 1000° F. and a pressure of from about 500 p.s.i.g. to about 2500 p.s.i.g. Said hydrocarbon conversion reactions further include polymerization of olefins, particularly ethylene, propylene, 1-butene, 2-butene, isobutylene, and also higher boiling olefins, at polymerization reaction conditions. The catalyst composite is also useful as a catalyst or a component thereof in effecting the alkylation of isoparaffins with olefins or other alkylating agents including, for example, alkyl halides and the like; and also for the alkylation of isobutane, isopentane and/or isohexane with ethylene, propylene, 1-butene, etc., or mixtures thereof; and also the alkylation of aromatics with olefins or other alkylating agents, particularly the alkylation of benzene, toluene, etc., with propylene, and higher boiling olefins including nonenes, decenes, undecenes, etc., the foregoing alkylation reactions being effected at alkylation conditions disclosed in the art. The catalyst products of the method of this invention are further helpful in the isomerization of paraffins, particularly n-butane, n-pentane, n-hexane, n-heptane, n-octane, etc., and also the isomerization of less highly branched chain saturated hydrocarbons such as the isomerization of 2- or 3-methylpentane to 2,3- and 2,2-dimethylbutane, isomerization of dimethylcyclohexane to methylcyclohexane, isomerization of methylcyclopentane to cyclohexane, etc., at isomerization reaction conditions. Other hydrocarbon conversion reactions including hydrogen transfer reactions, transalkylation reactions, and the reforming of gasoline or naphtha to improve the anti-knock characteristics thereof, are effectively catalyzed utilizing the catalyst composite prepared in accordance with the method of this invention as a catalyst or component thereof.

The following example is presented in illustration of the method of this invention and is not intended as a limitation on the generally broad scope of the invention as set out in the appended claims.

EXAMPLE

In the preparation of faujasite to be included in an amorphous silica matrix as herein contemplated, 780 grams of sodium aluminate, containing 23.3 weight percent sodium and 44.6 weight percent $Al_2O_3$, and 1,994 grams of sodium hydroxide pellets are dissolved in 9,520 milliliters of distilled water. This solution is allowed to cool with stirring and then added to 9,500 milliliters of an aqueous colloidal silica sol containing 35 weight percent $SiO_2$. The resultant mixture is aged without stirring over a period of about 20 hours. The reaction vessel is then sealed and heated at 203° F. for a 48 hour period to effect crystallization of the faujasite product. Thereafter, the mother liquor is decanted from the crystalline product which is then washed with distilled water until the pH of the wash effluent is about 10.5. The product is dried at about 250° F. The product composition is as follows:

| | Percent |
|---|---|
| Volatile @ 932° F. | 24.7 |
| $Al_2O_3$ | 22.51 |
| $SiO_2$ | 64.35 |
| $Na_2O$ | 12.5 | giving a high silica faujasite with a silica/alumina ratio of 4.86.

A portion of the faujasite thus prepared is incorporated in an amorphous silica matrix to the extent of 10 weight percent in the following manner. An acidic silica hydrosol is prepared initially by the addition of 24,200 milliliters of water glass (sodium silicate) solution, containing 6.9 weight percent $SiO_2$, to 3,000 milliliters of 25% sulfuric acid, the final pH being 4.2. To the resulting acidified silica hydrosol is added a homogenized faujasite prepared by the addition of 254 grams of dried faujasite including water of crystallization to one liter of water and homogenized by treatment in a blending apparatus for a period of about one minute. The pH of the resultant slurry is about 4.3. Gelation occurs within about 10 minutes with stirring being continued for an additional 50 minutes. The pH is then adjusted to 5.5 by the addition of the aforesaid water glass solution. After one hour of aging at said pH the aged product is filtered and reslurried in water. The slurry is adjusted to a pH of about 3.7 by the addition of glacial acetic acid, aged for a period of about 6 hours and spray-dried.

I claim as my invention:

1. A catalyst composite comprising a crystalline aluminosilicate dispersed in a silica matrix prepared by the method comprising:
    (a) forming a homogenized slurry comprising a finely divided crystalline alkali metal aluminosilicate and water,
    (b) admixing said slurry with a silica sol,
    (c) treating the reaction mixture at conditions effecting gelation of said silica sol,
    (d) adjusting the pH of the reaction mixture to from about 5 to about 8, and aging the same at said pH for a period of at least about 0.5 hours,
    (e) separating the aged gelation product, and
    (f) drying the resulting catalyst composite;
said method being further characterized in that the product of at least one of the steps (a), (b), (c), (d), (e), or (f) is treated, prior to treatment in accordance with a next succeeding step, in contact with an ion-exchange solution comprising hydrogen ions for a period of at least about 0.5 hour while maintaining the reaction mixture at a pH of from about 3.5 to about 4.0.

2. The catalyst composite of claim 1 further characterized with respect to step (a) in that said crystalline alkali metal aluminosilicate is a faujasite.

3. The catalyst composite of claim 2 further characterized with respect to step (a) in that said faujasite has a composition expressed in terms of oxide mole ratios as follows:

$$0.9 \pm 0.2 Na_2O : Al_2O_3 : 4.5 \pm 1.5 SiO_2 : yH_2O$$

where $y$ is a number up to about 8.

4. The catalyst composite of claim 3 further characterized with respect to step (f) in that said catalyst composite is dried by spray-drying means whereby a rapid evaporation of moisture is effected and dried particles fall out of the spray.

5. The catalyst composite of claim 4 further characterized with respect to step (f) in that said catalyst composite is spray-dried at an inlet temperature of from about 650° F. to about 1200° F.

6. The catalyst composite of claim 5 further characterized with respect to step (f) in that the dried catalyst composite is further treated in contact with a solution comprising ammonium ions whereby the total alkali metal content is reduced to less than about 1 weight percent thereof.

7. The catalyst composite of claim 6 further characterized with respect to step (f) in that the substantially alkali metal catalyst composite is base-exchanged in contact with a solution comprising rare earth metal cations whereby the final catalyst composite comprises aluminum and rare earth metals in a ratio of from about 3:1 to about 6:1.

8. The catalyst composite of claim 7 further characterized in that said ion-exchange solution comprises a weak acid.

9. The catalyst composite of claim 8 further characterized in that said weak acid is acetic acid.

10. The catalyst composite of claim 7 further characterized in that the product of step (a) is treated, prior to treatment in accordance with step (b), in contact with an ion-exchange solution comprising hydrogen ions for a period of at least about 0.5 hour while maintaining the reaction mixture at a pH of from about 3.5 to about 4.0.

11. The catalyst composite of claim 7 further characterized in that the product of step (b) is treated, prior to treatment in accordance with step (c), in contact with an ion exchange solution comprising hydrogen ions for a period of at least about 0.5 hour while maintaining the reaction mixture at a pH of from about 3.5 to about 4.0.

12. The catalyst composite of claim 7 further characterized in that the product of step (c) is treated, prior to treatment in accordance with step (d), in contact with an ion exchange solution comprising hydrogen ions for a period of at least about 0.5 hour while maintaining the reaction mixture at a pH of from about 3.5 to about 4.0.

13. The catalyst composite of claim 7 further characterized in that the product of step (d) is treated, prior to treatment in accordance with step (e), in contact with an ion-exchange solution comprising hydrogen ions for a period of at least about 0.5 hour while maintaining the reaction mixture at a pH of from about 3.5 to about 4.0.

14. The catalyst composite of claim 7 further characterized in that the product of step (e) is treated, prior to treatment in accordance with (f) in contact with an ion exchange solution comprising hydrogen ions for a period of at least about 0.5 hour while maintaining the reaction mixture at a pH of from about 3.5 to about 4.0.

15. The catalyst composite of claim 7 further characterized in that the product of step (f) is treated, prior to treatment in accordance with the next succeeding step, in contact with an ion exchange solution comprising hydrogen ions for a period of at least about 0.5 hour while maintaining the reaction mixture at a pH of about 3.5 to about 4.0.

References Cited

UNITED STATES PATENTS

| | | | |
|---|---|---|---|
| 3,140,253 | 7/1964 | Plank et al. | 208—120 |
| 3,352,796 | 1/1967 | Kimberlin, et al. | 252—455 |
| 3,425,956 | 2/1969 | Baker | 252—455 |

DANIEL E. WYMAN, Primary Examiner

C. F. DEES, Assistant Examiner

U.S. Cl. X.R.

252—455